Nov. 7, 1967  H. M. J. CHERMIN  3,351,807
GAS DISCHARGE DEVICE HAVING THERMIONIC ELECTRODES
ENERGIZED BY TRANSISTOR OSCILLATOR
Filed May 24, 1965

INVENTOR.
HUBERTUS M.J. CHERMIN
BY
AGENT

United States Patent Office

3,351,807
Patented Nov. 7, 1967

3,351,807
GAS DISCHARGE DEVICE HAVING THERMIONIC ELECTRODES ENERGIZED BY TRANSISTOR OSCILLATOR
Hubertus Mathias Jozef Chermin, Emmasingel, Eindhoven, Netherlands, assignor to North American Philips Company, Inc., New York, N.Y., a corporation of Delaware
Filed May 24, 1965, Ser. No. 458,053
Claims priority, application Netherlands, May 30, 1964, 64—6,126
3 Claims. (Cl. 315—99)

ABSTRACT OF THE DISCLOSURE

A control circuit for energizing a gas discharge tube of the type having thermionic electrodes includes a transistor DC-AC inverter as the energy source. A first capacitor is connected in series between the tube electrodes to complete the current circuit therefor. The capacitor and tube electrodes form a part of the resonant load circuit for the inverter. In order to prevent damage to the transistors in the inverter in the event a tube electrode open circuits, each of the electrodes is shunted with a capacitor that is larger than said first capacitor. The impedance of the shunt capacitors at the nominal operating frequency of the inverter is substantially higher than the resistance of the tube electrodes.

---

This invention relates to circuits for energizing gas-discharge lamps having two thermionic cathodes. In this kind of circuits it is advantageous, as described in U.S. Patent 2,438,556, to complete the current circuit of the thermionic cathodes by means of a capacitor included between one of the ends of each of the cathodes.

If the gas-discharge lamps is energized by a direct voltage-alternating voltage converter, said capacitor usually forms part of an output oscillatory circuit of the converter.

It has been explained in copending U.S. patent application Ser. No. 368,105 filed May 18, 1964 that, when using a semiconductor converter, the current flowing through said oscillatory circuit must be greater, for example, 4 or 5 times greater than the current corresponding to the energy absorbed by the lamp. If this is not the case the converter will be heavily overloaded if, for example, near the end of the life of the gas-discharge lamp, one cathode emits less satisfactorily than the other and a rectifying phenomenon occurs in the lamp. Such excess load may damage or deteriorate a semiconductor element of the converter.

The capacitor included between the cathodes constitutes an appreciable portion of the total capacitance of the output oscillatory circuit of the converter so that, upon interruption of one cathode, the current flowing through said circuit greatly decreases. At the same time, the discharge lamp usually acquires rectifying properties as a result of the interruption, so that the converter is heavily overloaded. Under these conditions it may readily happen that a semiconductor element of the converter is damaged or deteriorated.

An object of the invention is to provide a circuit for energizing a gas-discharge lamp, for example, a fluorescent lamp, having two thermionic cathodes from a direct voltage-alternating voltage converter having at least one controlled semiconductor element, for example, a transistor or a controlled semiconductor rectifier, and an output oscillatory circuit, wherein the current circuit of the thermionic cathodes is completed by a capacitor connected between one of the ends of each of the cathodes and included in the output oscillatory circuit of the converter, and wherein any risk of damage or deterioration of the semiconductor element or elements of the converter in the case of interruption of one of the thermionic cathodes is avoided.

The circuit according to the invention is characterized in that each thermionic cathode of the discharge lamp is shunted by a capacitor having a capacitance higher than that of the first-mentioned capacitor and having an impedance higher than that of the thermionic cathode connected in parallel with it.

Figure 1:
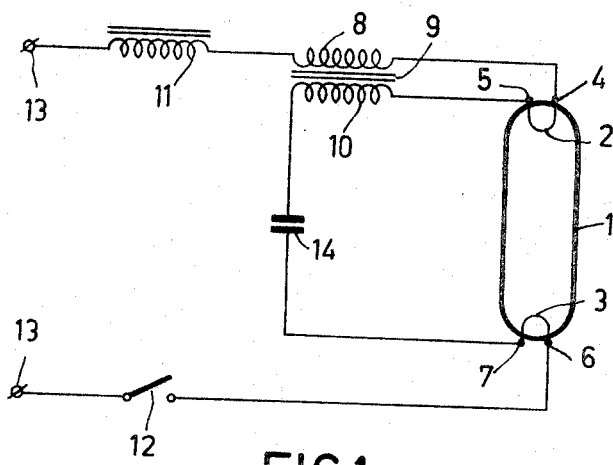
Figure 2:
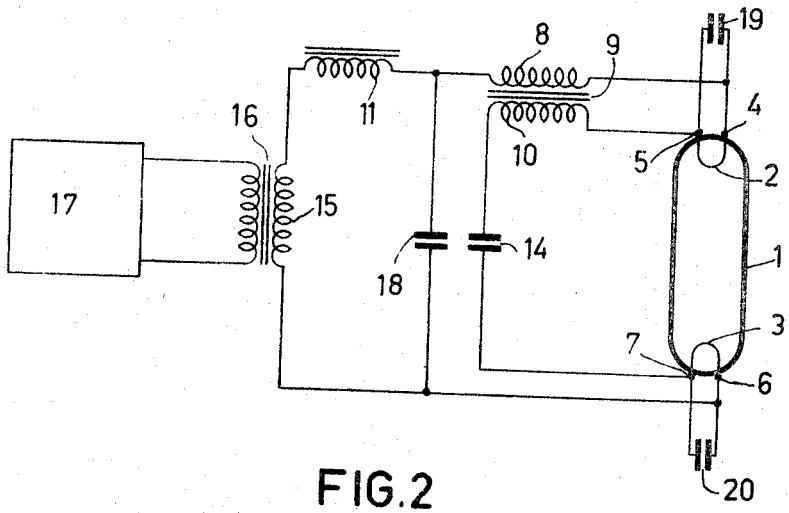

In order that the invention may be readily carried into effect, it will now be described in detail, by way of example, with reference to the accompanying drawing, in which:

FIGURE 1 shows a circuit according to U.S. Patent 2,438,556 and
FIGURE 2 shows a circuit according to the invention.

The circuit according to U.S. Patent 2,438,556, as shown in FIGURE 1, is designed to energize a gas-discharge lamp 1, for example, a fluorescent lamp, including two thermionic cathodes 2 and 3 each having two ends or connecting terminals 4, 5 and 6, 7 respectively. One of the terminals 4 and 6, respectively of each cathode is connected to an alternating-voltage source 13 through a primary winding 8 of a transformer 9 and a control inductor 11 and through an on- and off-switch 12, respectively. The heating-current circuit of the cathodes 2 and 3 is completed by a capacitor 14 included between the terminals 5 and 7 in series with a secondary winding 10 of the transformer 9. The windings 8 and 10 of the transformer 9 are arranged so that the field produced by the current flowing through the winding 10 counteracts the field produced by the current flowing through the winding 8. Prior to the ignition of the lamp 1, said two currents are equal so that for a ratio of approximately 1:1 of the number of turns of the windings 8 and 10 the impedance of these windings is very small. The heating current of the cathodes 2 and 3 is thus determined by the capacitor 14 and is, for example, 0.38 amp.

After the ignition of the lamp 1, the current flowing through the winding 8 is equal to the vectorial sum of the discharge current flowing through the lamp, of say 0.4 amp., and of the current flowing through the winding 10. The impedance across this winding thus increases and hence the voltage across the capacitor 14 will decrease. Due to the comparatively high operating frequency, the current flowing through said capacitor and hence through the winding 10 drops only slightly lower, for example, to 0.36 amp. The vectorial sum of said two currents flowing through the winding 8 is not much lower, for example, 0.20 amp.

FIGURE 2 shows an embodiment of the circuit according to the invention, in which corresponding elements are provided with the same reference numerals as in FIGURE 1.

The discharge lamp is connected through the primary winding 8 of transformer 9 to a secondary winding 15, shunted by a capacitor 18, of an output transformer 16 of a direct voltage-alternating voltage converter 17. This converter is shown in block-form and is equipped with controlled semiconductor elements such as transistors or controlled semiconductor rectifiers. The capacitor 18, of say 0.02 µf., constitutes together with the elements previously mentioned in connection with the circuit of FIGURE 1, the capacitive portion of the output oscillatory circuit of the converter 17, whereas the inductive portion thereof is constituted by the stray inductance of the transformer 16, possibly in series with a control inductance such as the inductor 11 of FIGURE 1. At an operating frequency of, for example, 8000 c./s. of the converter 17, the capacitor 14 has a value of, for example, 0.04 μf., and thus constitutes a considerable portion of the capacitance of the output oscillatory circuit 11, 14, 15, 16, 18.

During operation it may happen that one of the cathodes 2 and 3 breaks, for example, by the end of the normal life of the fluorescent lamp 1 and/or as the result of a heavy shock. The heating circuit of the cathodes 2 and 3 is thus interrupted, the cathodes emit a smaller amount of electrons, and the lamp 1 usually also acquires rectifier properties. At the same time the natural frequency of the output oscillatory circuit 11, 14, 15, 16 and 18 changes substantially since the capacitor 14 is no longer a part of it. Also, the current flowing through the primary winding 8 of transformer 9 increases since compensating current no longer flows through the secondary winding 10 thereof. Thus a highly inductive load constituted by the discharge path of the lamp 1 in series with the inductance of the winding 8 is now connected in parallel with the remaining portion 11, 15, 16, 18 of the output oscillatory circuit of the converter 17.

If the converter 17 includes a control oscillator and/or if its operating frequency is not determined substantially by the natural frequency of its output oscillatory circuit, it is very poorly matched to its load if said natural frequency varies greatly. Furthermore the current flowing through the output oscillatory circuit greatly decreases so that even a small difference between the electron emissions of the cathodes 2 and 3 which are no longer heated may cause the output stage of the converter 17 to be overloaded.

If, however, the operating frequency of the converter 17 is determined substantially by the natural frequency of its output oscillatory circuit 11, 14, 15, 16, 18, the operating frequency greatly increases if one of the cathodes 2 and 3 breaks and the capacitor 14 drops out of the circuit. The increase being, for example, in a ratio of $\sqrt{3/1}$ from 8000 c./s. to 13,840 c./s. In this case also the load is matched poorly and the current flowing through the output oscillatory circuit has decreased in the inverse ratio of, for example, $1/\sqrt{3}$, so that the converter 17 is liable to be overloaded due to possible rectifying properties of the damaged lamp 1. In this case also such excess load may damage or deteriorate the semiconductor element or elements of the converter.

To prevent the converter 17 from being overloaded upon breakage of one of the cathodes of the lamp 1, according to the invention the thermionic cathodes 2 and 3 are shunted by capacitors 19 and 20, respectively, each having a capacitance of, for example, 0.1 μf., which is higher than that of the capacitor 14, and each having an impedance of, for example, 200 ohms, which is higher than that of the thermionic cathodes 2 and 3 which are connected in parallel with it and, in the hot state, each have an impedance of approximately 9 ohms.

Under normal operating conditions and especially during the pre-heating period of the cathodes, the shunitng capacitors 19 and 20 have substantially no influence on the heating current flowing through the cathodes 2 and 3 and on the natural frequency of the output oscillatory circuit 11, 14, 15, 16, 18 of the converter 17. However, if one of the cathodes 2 and 3 breaks, the impedance of the circuit including the capacitor 14 and the two cathodes 2 and 3 shunted by the capacitors 19 and 20 is hardly increased, the capacitor of this circuit included in the output oscillatory circuit is hardly decreased, and the natural frequency of this oscillatory circuit is influenced even less.

The load of the converter 17 is decreased only to a very small extent through the disappearance of the energy of, for example, approximately 0.5 watt normally provided for heating the interrupted cathode. The current flowing through the output oscillatory circuit 11, 14, 15, 16, 18 remains substantially unchanged so that the converter 17 and its controlled semiconductor element or elements is or are not overloaded even if the damaged lamp 1 exhibits substantial rectifying properties.

What is claimed is:

1. An electric supply circuit comprising a gas discharge tube having a pair of spaced thermionic electrodes defining a discharge path therebetween, a D.C.-A.C. inverter comprising at least one controlled semiconductor element, a first capacitor connected in series with said tube electrodes and across the tube discharge path so as to complete the heating circuit of said electrodes, a resonant circuit coupling the output of said inverter to said tube electrodes so that said first capacitor forms a part of said resonant circuit, a pair of other capacitors each having a value of capacitance that is higher than the capacitance of said first capacitor, and means for connecting each of said other capacitors in shunt with an individual one of said tube electrodes, each of said other capacitors being chosen to have an impedance at the operating frequency of said inverter that is substantially higher than the impedance of the thermionic electrode in parallel therewith.

2. A circuit as described in claim 1 further comprising a transformer having a primary winding connected to the output of said inverter and a secondary winding, a second capacitor connected in parallel with said secondary winding to form said resonant circuit, and means for coupling one terminal of each of said tube electrodes to said resonant circuit so that said tube electrodes and said first capacitor are serially connected across said resonant circuit.

3. An electric supply circuit comprising a gas discharge tube having a pair of spaced thermionic electrodes each of which has a pair of terminals, a D.C.-A.C. inverter including at least one controlled semiconductor element, a frequency determining output circuit for said inverter including the parallel connected combination of an inductor and a capacitor, means coupling one terminal of each of said electrodes to said output circuit so as to connect said discharge tube across the output circuit, a second capacitor, means connecting said second capacitor between the other terminals of said electrodes thereby to complete the heating current circuit for said electrodes, a pair of other capacitors, means connecting one of said other capacitors across the terminals of one tube electrode and means connecting the second of said other capacitors across the terminals of the other tube electrode, said other capacitors being chosen to have a capacitance that is substantially higher than the capacitance of said second capacitor and to have an impedance at the nominal frequency of said inverter that is substantially higher than the impedance of the thermionic electrodes when heated.

References Cited

UNITED STATES PATENTS

| | | | |
|---|---|---|---|
| 1,510,847 | 10/1924 | Holler | 315—185 |
| 2,291,355 | 7/1942 | Simmon | 315—99 |
| 3,005,130 | 10/1961 | Schwartz | 315—206 |

DAVID J. GALVIN, *Primary Examiner.*